Figure 1:
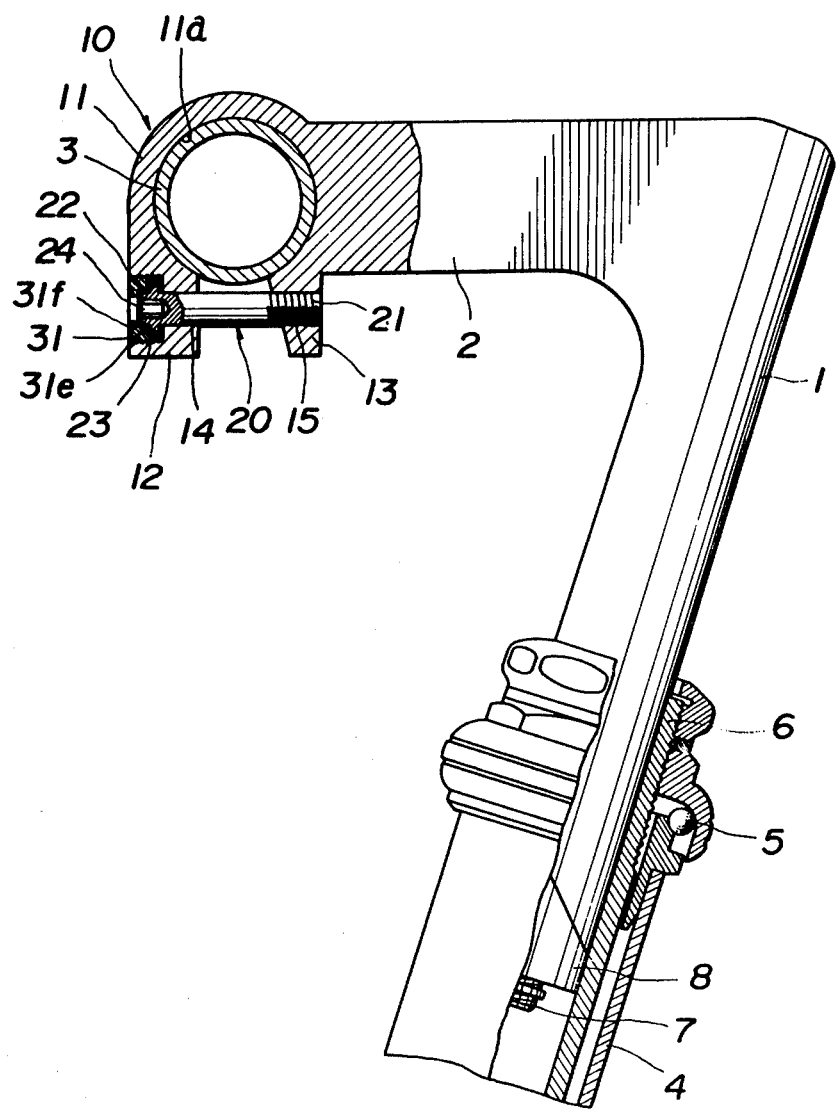

United States Patent [19]

Katayama

[11] 4,261,666
[45] Apr. 14, 1981

[54] CLAMP DEVICE FOR A BICYCLE AND THE LIKE

[75] Inventor: Hitoshi Katayama, Sakai, Japan

[73] Assignee: Shimano Industrial Company, Limited, Osaka, Japan

[21] Appl. No.: 921,096

[22] Filed: Jun. 30, 1978

[30] Foreign Application Priority Data

Jul. 12, 1977 [JP] Japan .............................. 52/92842[U]

[51] Int. Cl.³ .......................... B25G 3/24; B62K 21/18
[52] U.S. Cl. ...................................... 403/235; 24/279; 74/551.6; 403/373
[58] Field of Search ...................... 24/243 B, 275, 279, 24/280; 74/551.1, 551.6; 403/21, 344, 373, 235; 85/1.5 R; 151/69

[56] References Cited

U.S. PATENT DOCUMENTS

| Re. 19,386 | 11/1934 | Hand et al. | 24/243 B |
| 3,109,663 | 11/1963 | Phillips, Jr. | 24/279 |
| 3,385,615 | 5/1968 | Hussey | 74/551.6 |

*Primary Examiner*—Kenneth Dorner
*Attorney, Agent, or Firm*—Stevens, Davis, Miller & Mosher

[57] ABSTRACT

A clamp device is described comprising a clamp having a cylindrical portion and a pair of first and second saddles, and a clamping screw bolt, the first saddle having a through hole and the second one having a threaded hole screwable with a screw thread of the bolt, which device is provided at the first saddle with retaining means for retaining the bolt substantially axially fixed and utilizes thrust caused by screwing the bolt with the threaded hole to enlarge easily an interval between the first and second saddles. The device requires no particular tool for effecting clamping.

1 Claim, 6 Drawing Figures

CLAMP DEVICE FOR A BICYCLE AND THE LIKE

This invention relates to a clamp device for securing a member to a mounting member at a bicycle and similar vehicles, and more particularly to the clamp device for a bicycle and similar vehicles (hereinafter called merely a bicycle), which mounts the member, such as a handle lever or lever means for derailleurs or brakes, to the mounting member, such as a handle stem or bicycle frame.

Conventionally, the clamp device for securing the bicycle member to the mounting member is composed of a clamp having a cylindrical member cut out at at least one position and a pair of opposite saddles extending radially from both ends of the cutout respectively and a clamping screw bolt and nut, the bolt being carried across both saddles. The bolt is tightened by the nut to radially contract the cylindrical portion, thereby mounting the member to the mounting member. The mounting is divided into two cases such that the handle bar carrying the clamp device is mounted to the handle stem and that lever means for derailleurs is mounted to the handle bar or bicycle frame. In the former case, the clamp is integrated with the handle lug end of the handle stem, whose cylindrical portion is inserted onto the handle bar and the bolt is tightened by the nut, thereby fixing the handle bar to the handle stem through the clamp secured to the handle bar. In the latter case, the clamp is fixed to the fixing member of the lever means, whose cylindrical portion is inserted onto the handle bar or frame, thereby mounting the lever means thereto by tightening the bolt.

In both of the foregoing cases, the cylindrical portion should be inserted onto the handle bar or frame by enlarging an interval between the two opposite saddles. The clamp, however, is greatly rigid for securing the handle bar or lever means, especially for the former, so that it is difficult to expand the clamp by use of a common hand tool rather than a special one. The special tool happens to hit the clamp to cause its damage. Such a problem arises similarly when the member is removed from the mounting member.

Furthermore, the bolt and nut of the conventional clamp device are merely inserted but not tied, whereby a user may happen to separate them from the clamp resulting in missing a bolt or nut.

In view of the abovementioned problems, the invention has been designed. A main object of the invention is the provision of a clamp device capable of simply and readily expanding the clamp in the absence of damage thereto.

Another object of the invention is the provision of a clamp device always reserved as a set with the bolt.

The clamp device of the invention is provided with a clamp comprising a substantially cylindrical portion and a pair of first and second saddles and with a clamping screw bolt, the first saddle having a through hole and the second one having a threaded bore screwable with the bolt through a screw thread thereof. Retaining means are provided at the second saddle for retaining the bolt substantially axially fixed, whereby thrust caused by screwing the bolt with the second saddle is used for easily enlarging an interval between the first and second saddles without any special tool. Furthermore, the retaining means which always keeps the bolt together with the clamp, enables the clamp device to be reserved as a set including a bolt.

It is to be noted that the clamp device of the invention is applicable for securing the handle bar to the handle stem and for mounting the lever means for derailleurs to the handle bar or bicycle frame. In the former case, the clamp is connected to the handle stem and in the latter to the fixing member of the lever, both connections applying the clamp device of the invention to expand the clamp by enlarging the interval between the first and second saddles resulting from thrust caused by screwing the bolt.

In addition, the retaining means includes at least one retainer in engagement with a larger diameter portion inclusive of the bolt head so that the bolt is substantially restrained from axially moving. Substantially restraining indicates that there is a tolerance in which the bolt head is permitted to turn, but further turning or excessive movement is restrained.

Figure 2:
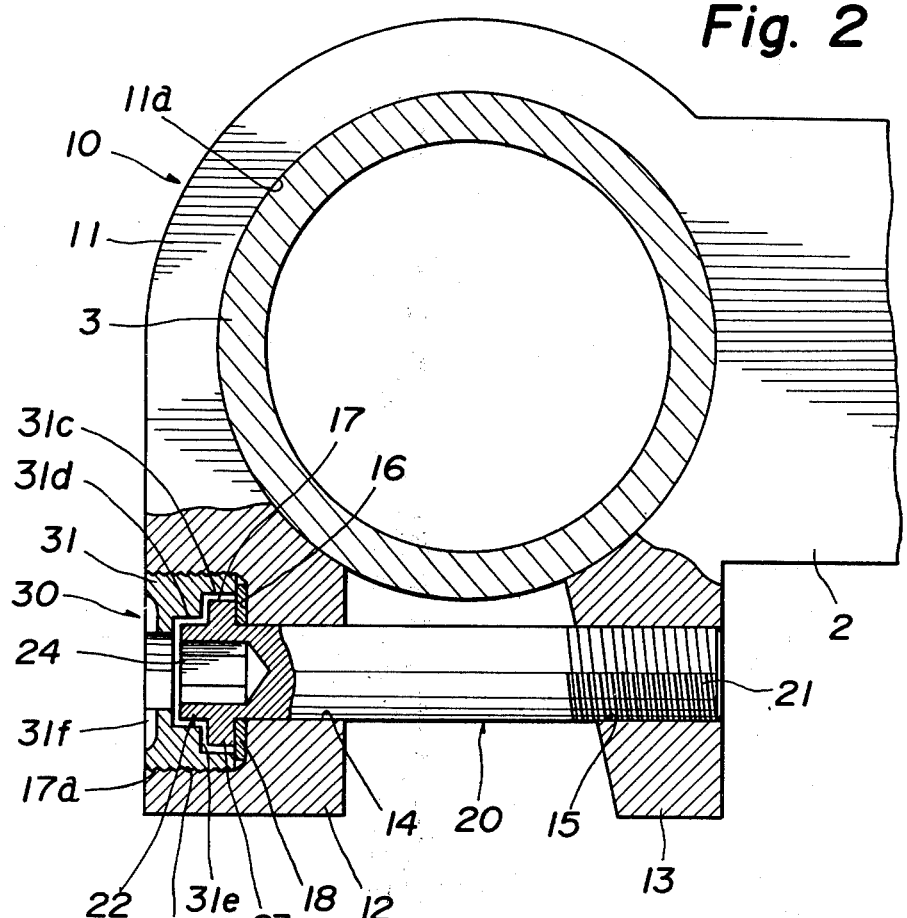
Figure 3:
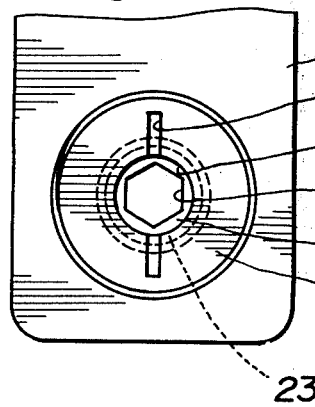
Figure 4:
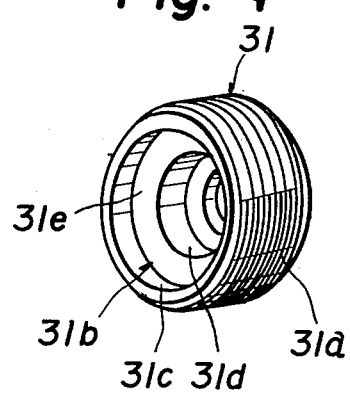
Figure 5:
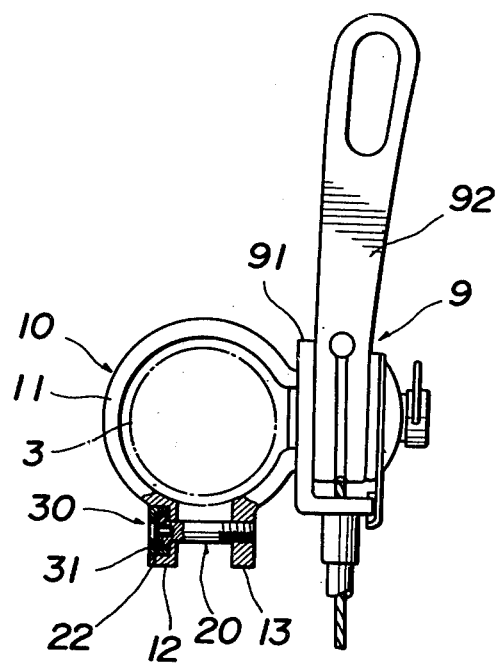
Figure 6:
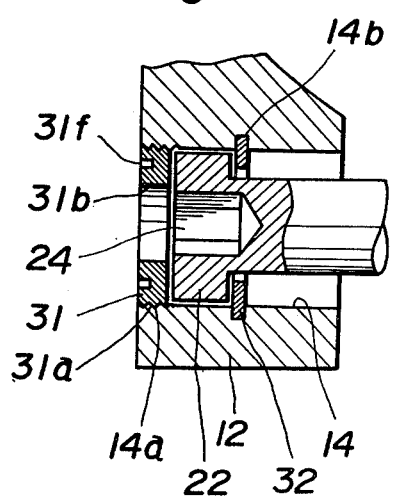

These and other objects of the invention will be more apparent from the following description of the embodiments in accordance with the accompanying drawings, in which:

FIG. 1 is a partially cutaway front view of an embodiment of the invention, showing application of the clamp device thereof for fixing the handle bar to the handle stem, FIG. 2 is a partially cutaway front view of an enlarged principal portion of the clamp device in FIG. 1, FIG. 3 is a partial side view of only the first tightening saddle in FIG. 2, looking from the left side thereof, FIG. 4 is a perspective view of the retainer used in the clamp device in FIGS. 1 and 2, FIG. 5 is a partial cutaway front view of the embodiment of the invention, showing application of the clamp device for mounting the lever means for derailleurs to the bicycle frame, and FIG. 6 is a sectional view of the principal portion of a modified embodiment of the invention.

Referring to FIGS. 1 and 2, the reference numeral 1 designates a handle stem. The handle stem 1 has a lug 2 extending forwardly from the upper end of the same, the lug 2 being incorporated at its end with the clamp device of the invention, thereby fixing thereat a handle lever 3. In addition, the handle stem 1 is fixed through a bolt 7 and cone 8 to a front fork 6 rotatably supported to a head pipe 4 of the bicycle frame through balls 5.

The clamp device of the invention, as enlarged in FIG. 2, comprises; a clamp 10 comprising a cylindrical portion 11 cut out at at least one circumferential position and first and second saddles 12 and 13 extending radially outward from both ends of the cylindrical portion 11 across the cutout; a clamping screw bolt 20; and retaining means 30 for retaining the bolt 20 substantially axially fixed.

The first tightening saddle 12 opposite to the second one 13 has a through hole 14, the second tightening saddle 13 providing a threaded bore 15 screwable with the bolt's tip through a screw thread 21 thereof. The bolt 20 has at its head 22 a flange 23 of larger diameter portion than the bolt shank, the head 22 being provided at its axially outer end face with a rotary control recess 24 into which a tool, such as a hexagonal wrench, is fit for control.

Referring to FIGS. 1 and 2, the clamp 10 is integrated with the lug 2, whose cylindrical portion 11 is made round at its inner periphery to fit the handle bar 3.

The retaining means 30 comprises a recess 17 and at least one retainer 31, the recess 17 being provided at the outer end face of the first saddle 12 and larger in diameter than the through hole 14 and being in continuation thereof through a shoulder 16, and the retainer 31 being insertably screwed with the recess 17 and engaged with the flange 23 at the bolt head 22, thereby blocking the bolt 20 to be axially fixed with respect to the first tightening saddle 12. The clamping screw bolt 20 is lodged at the head 22 within the recess 17 so that the axially inner end face of the flange 23 subtends the shoulder 16 and the axially outer end face of the same subtends the retainer 31 screwed with the recess 17, through slight gaps between the flange and the retainer and shoulder respectively. Hence, the shoulder 16 and retainer 31 allow the bolt 20 to move only in the gap but not to further move, thereby substantially blocking the bolt to be axially fixed.

The aforesaid retainer 31 is, as shown in FIG. 4, cylindrical and threaded 31a at a central bore 31b thereof and stepped at the inner periphery to form a larger diameter portion 31c, a smaller one 31d and a stepped portion 31e therebetween. In addition, the recess 17 also is made round to fit the retainer 31 formed as the foregoing and threaded 17a at the inner periphery of the same, whereby the retainer 31 is screwed with the recess 17 through the threads 31a and 17a, thus allowing the stepped portion 31e to face the axial outer end face of the flange 23.

Incidentally, recesses 31f shown in FIGS. 2 and 3 are formed for screwable control at the outer end face of the retainer 31. In addition, the outer end face of the retainer 31 is opened larger than the rotary control recess 24, whereby the tool, such as a hexagonal wrench, is insertably fit thereto. Also, a washer 18 is shown in FIGS. 1 and 2.

In the foregoing construction, the handle bar 3 is fixed to the handle lug in such a manner that the hexagonal wrench is fit into the control recess 24 to turn the bolt counterclockwise to be unscrewed, then the flange 23 is engaged with the retainer 31 and the retainer is urged axially outward, but the retainer 31 integrated with the first saddle 12 restrains further axial movement of the bolt 20, whereby the unscrewed bolt moves the first and second saddles to depart from each other enlarging the interval between the opposite faces of the saddles, thus radially expanding the cylindrical portion 11 of the clamp 10, and after inserting the handle bar 3 into the expanded clamp 10 the bolt 20 is screwed by the wrench to radially contract the cylindrical portion 11, whereby the clamp 10 fixes the handle bar 3 to the lug.

On the other hand, when removing the handle bar 3 from the lug, the bolt 20 is unscrewed radially expanding the clamp as in the foregoing.

Thus, even if it has a larger outer diameter than the interval between the first and second saddles, the handle bar 3 can be easily fixed or removed from the lug.

In the aforesaid embodiment, the clamp device is applied for securing the handle bar 3 to the handle stem 1, which is, as shown in FIG. 5, applicable for mounting the lever means 9 for derailleurs to a top tube or the handle bar 3 of the bicycle frame.

In this instance, the clamp 10 is attached to a fixing member 91 which rotatably supports therewith a lever 92 at the lever means 9.

Next, the retaining means 30, which comprises the recess 17 and one of the retainers 31 as shown in FIGS. 1 and 2, may be composed of first and a second retainers 31 and 32 as shown in FIG. 6, in which the through hole 14 at the first tightening saddle is made straight and threaded 14a at its inner periphery. The first retainer 31 is cylindrical and threaded 31a at the outer periphery, the same as in the former embodiment, whereby the first retainer 31 is screwed with the first saddle 12 through the thread 31a and 14a. The second retainer 32 comprises a split ring of a smaller inner diameter than the outer diameter of the bolt head 22, the ring being fit into an annular inner groove 14b at the through hole 14.

Incidentally, the second retainer 32 may comprise a cylinder or disc in place of the ring, the cylinder or disc being screwed with the thread 14a, and the first retainer 31 also may be a split ring.

It is to be noted that the two applied retainers 31 and 32 make the through hole 14 straight at its inner periphery, thereby facilitating machining thereof.

As clearly understood from the aforesaid description, a simple operation of unscrewing the clamping bolt enables the first and second tightening saddles at the clamp to enlarge the interval therebetween, thereby facilitating expansion of the clamp. Hence, the clamping bolt is turned only to allow the cylindrical portion of the clamp to be inserted onto the handle bar or frame, consequently, any conventional particular tool is not required for expanding the clamp device, and the clamp, when expanded, and the handle bar or frame as well are not damaged. Furthermore, the clamp always keeps therewith the clamping bolt.

While, the invention has been particularly shown and described with reference to preferred embodiments thereof, it will be understood by those skilled in the art that the foregoing and other changes in forms and details can be made without departing from the spirit and scope of the invention.

What is claimed is:

1. A device for fixing a handle bar to the end of a lug at a handle stem of a bicycle comprising:

a clamp at the end of said lug comprising a cylindrical section connected to said lug, said cylindrical section terminating in first and second ends separated by a cutout portion; said cylindrical section having an inner circumference for receiving said handle bar and being fixed therewith; first and second tightening saddles extending radially outward from said first and second ends, said first tightening saddle having a through hole, said second tightening saddle having a threaded hole opposite said through hole;

a clamping bolt having a head at one end thereof and threads at the remaining end extending through said through hole at said first tightening saddle and being screwed with said threaded hole at said second tightening saddle for tightly fixing said handle bar and cylindrical section together, said head having a larger diameter portion; and retaining means for retaining said clamping bolt to said first tightening saddle substantially axially fixing said clamping bolt, said means for retaining including one retainer engaged with one side of said larger diameter portion of said clamping bolt head and said through hole, and a second retainer comprising a split ring located in a recess in said through hole, said first and second retainers thereby axially restraining said clamping bolt in two directions.

* * * * *